(12) United States Patent
Fripp et al.

(10) Patent No.: US 12,638,421 B2
(45) Date of Patent: May 26, 2026

(54) ACOUSTIC MEASUREMENT OF SURFACE ROUGHNESS

(71) Applicant: Halliburton Energy Services, Inc., Houston, TX (US)

(72) Inventors: Michael Linley Fripp, Singapore (SG); Zeqing Sun, Singapore (SG); Mark A. Woodmansee, Houston, TX (US); Xiang Wu, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 299 days.

(21) Appl. No.: 18/206,982

(22) Filed: Jun. 7, 2023

(65) Prior Publication Data

US 2024/0410859 A1    Dec. 12, 2024

(51) Int. Cl.
| | |
|---|---|
| *G01N 29/04* | (2006.01) |
| *G01N 29/12* | (2006.01) |
| *G01N 29/44* | (2006.01) |
| *G01N 29/48* | (2006.01) |

(52) U.S. Cl.
CPC .......... *G01N 29/041* (2013.01); *G01N 29/12* (2013.01); *G01N 29/449* (2013.01); *G01N 29/48* (2013.01)

(58) Field of Classification Search
CPC .... G01N 29/041; G01N 29/12; G01N 29/449; G01N 29/48
See application file for complete search history.

(56) References Cited

U.S. PATENT DOCUMENTS

| | | | |
|---|---|---|---|
| 5,801,312 A | * | 9/1998 | Lorraine ............. G01S 15/8965 |
| | | | 73/620 |
| 5,965,818 A | | 10/1999 | Wang |
| 6,481,268 B1 | | 11/2002 | Povey et al. |
| 9,541,537 B1 | * | 1/2017 | Bai ............................ G01B 5/28 |
| 10,986,765 B2 | | 4/2021 | Schnaider et al. |
| 2020/0011169 A1 | * | 1/2020 | Haghshenas .......... G01M 3/243 |

FOREIGN PATENT DOCUMENTS

| | | |
|---|---|---|
| JP | 095449 A | 1/1997 |
| JP | 2008082856 A | 4/2008 |
| JP | 2015215217 A | 12/2015 |
| WO | 2016010517 A1 | 1/2016 |

OTHER PUBLICATIONS

"An Acoustic Sensor System for Determination of Macroscopic Surface Roughness" by Swart et al. (Year: 1996).*

(Continued)

*Primary Examiner* — Xin Y Zhong
(74) *Attorney, Agent, or Firm* — NOVAK DRUCE CARROLL LLP

(57) ABSTRACT

Systems and methods for evaluating a roughness of a surface are disclosed. The system includes an acoustic emitter configured to emit an acoustic signal and an acoustic receiver configured to detect a reflection of the emitted acoustic signal from the surface and provide a data signal comprising a portion of the reflected signal. The system also includes a processor configured to receive the data signal and determine the roughness based in part on a difference between the emitted acoustic signal and the reflected acoustic signal.

20 Claims, 3 Drawing Sheets

(56)　　　　　References Cited

OTHER PUBLICATIONS

International Search Report & Written Opinion; PCT Application No. PCT/US2023/024789; mailed Feb. 27, 2024.

English abstract of JP2015215217; retrieved from www.espacenet.com on Feb. 28, 2024.

English abstract of JP2008082856; retrieved from www.espacenet.com on Feb. 28, 2024.

English abstract of JP095449; retrieved from www.espacenet.com on Feb. 28, 2024.

* cited by examiner

ACOUSTIC MEASUREMENT OF SURFACE ROUGHNESS

TECHNICAL FIELD

The present technology pertains to non-contact surface roughness measurement in a field environment.

BACKGROUND

Handling and transportation of corrosive liquids poses a challenge for the construction of tanks, pipes, and other components of a liquid-handling system. The components must not only meet strength and performance requirements but withstand the attack of the liquid itself. Components are often made of corrosion-resistant material or incorporate a corrosion-resistant coating. Even with this, however, the surface often degrades over time and becomes rougher, which often diminishes performance. Monitoring the roughness of components, e.g., the interior of a pipeline, in the field is a persistent problem.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figures 1, 2, 3, 4, 5, 6:
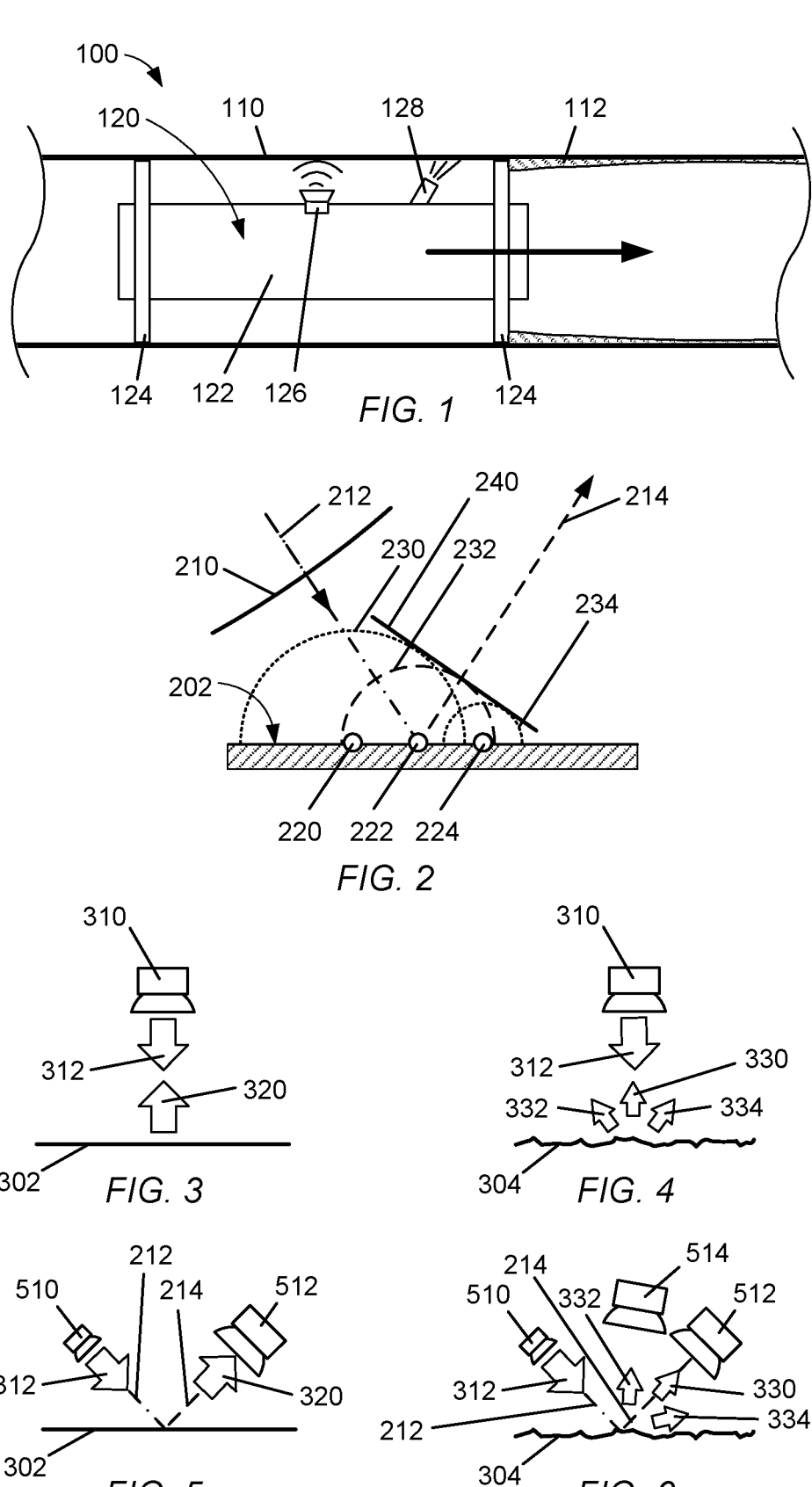
FIG. 1 is a schematic view of a smart "pig" traversing a pipeline, in accordance with various aspects of the subject technology.
FIG. 2 illustrates acoustic reflection from a smooth flat surface, in accordance with various aspects of the subject technology.
FIGS. 3-8 depict examples of how an acoustic signal is emitted, reflected, and detected, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Inspecting a component in the field, e.g., a pipeline that has been used to transport a fluid comprising one or more of carbon dioxide, hydrogen, and ammonia, is challenging. One parameter that can be inspected as an indicator of the condition of the component is the roughness of a surface of the component, which may be associated with a degree of corrosion of the component. The surface may be nonplanar and is often contaminated, e.g., residual oil in the pipeline. There may be an extensive surface area to be inspected and a limited amount of time to complete the inspection. Conventional methods of detecting defects or bulk metal loss in pipe walls include magnetic flux leakage and measurement of the pipe thickness using ultrasonic reflections for the interior and exterior surfaces. Conventional methods of measuring roughness include a contact method, e.g., a stylus, or optical observation of the surface. These methods are often limited in the speed of inspection and the types of defects that are detectable.

The technology disclosed herein addresses the foregoing challenges by describing systems and methods of measuring roughness that are fast and robust. The system emits an acoustic signal and detects one or more reflections of the emitted signal from a component surface that is proximate to the system. The emitted signal has one or more characteristics that are modified by the roughness of the reflecting surface. The received signal is compared to the emitted signal to measure these modified characteristics and determine a roughness parameter.

FIG. 1 is a schematic view 100 of a smart "pig" 120 traversing a pipeline 110, in accordance with various aspects of the subject technology. The pig 120 has a body 122 equipped with two or more guide disks 124 that position the body within the pipeline 110. In certain embodiments, the guide disks remove debris 112 from the interior wall of the pipeline 110 as the pig 120 moves through the pipeline 110. The pig comprises an acoustic inspection system 126 that is coupled to the body 122 and directed toward the interior surface of the pipeline 110. In certain embodiments, the pig has a surface preparation device 128 to clean and/or prepare the interior surface for inspection by the acoustic inspection system 126. In certain embodiments, the surface preparation device 128 comprises one or more of a compressed gas nozzle, a fluid nozzle, and a mechanical wiper (not visible in FIG. 1) intended to remove or minimize any material coating the interior surface of the pipeline 110. In certain embodiments, the system is used as part of a wireline survey of a wellbore for production or for injection.

Within this disclosure, the term "acoustic" means mechanical waves in a fluid, e.g., gases and/or liquids, having a frequency in the audio and/or ultrasonic ranges.

Within this disclosure, the term "acoustic signal" means a wave that may be continuous or a single short-duration wave or an intermittent wave, e.g., repetitive pulses or impulses. The wave may have a pattern of waves of various durations or amplitudes. The wave may comprise components at one or multiple frequencies.

FIG. 2 illustrates acoustic reflection from a smooth flat surface 202, in accordance with various aspects of the subject technology. In this example, a first acoustic signal 210 is emitted along an emission axis 212 toward the surface 202. A reflection axis 214 is defined by a specular reflection of the emission axis 212 from an ideally smooth form of the surface 202, i.e., the angle of incidence of the emission axis 212 at the surface 202 is the same as the angle of the reflection axis 214 from the surface 202. Although wavefront 210 may be curved, e.g., a spherical wave propagating outward from a single point, the wavefront 210 can be treated as a planar wavefront in an area close to the emission axis 212.

The wavefront 210 reaches the surface 202 at time increments related to the angle of the emission axis 212 to the surface 202. In this example, the wavefront 210 reaches point 220 first, then reaches point 222 after a first increment in time, then reaches point 224 after a second increment of time. The wavefront 210 was reflected from point 220 to create wavefront 230. Similarly, the reflection at point 222 created wavefront 232, delayed by the first increment in time, and the reflection at point 224 created wavefront 234, further delayed by the second increment in time. The combined wavefronts 230, 232, 234 create a reflected wavefront 240 that is perpendicular to reflection axis 214 and moving outward along the reflection axis 214.

In this example, the first acoustic signal has been created with one or more known characteristics, e.g., a frequency, a wave shape with a peak amplitude, a single pulse, or a "chirp" that may include multiple pulses in a pattern. The degree to which the reflected wavefront 240 retains the characteristics of the incident emissions wavefront 210 is a measure of the "coherence" of the reflected wavefront 240. A wavefront reflected from a perfectly smooth surface 202 will have a maximum coherence. A surface 202 that has some amount of roughness, e.g., scratches, pitting, adhered debris, or formation of a corrosion product, will reflect a portion of the incident emission wavefront 210 in directions other than the reflection axis 240. The amount of energy reflected in directions other than the reflection axis 214 is a measure of the "incoherence" of the reflected wavefront 240.

In certain embodiments, a pig 120 has multiple acoustic inspection systems 126 and a system 126 may receive reflected signals that originated from the one of the other systems. In certain embodiments, each system 126 uses a different form of the emission signal characteristic, e.g., a unique chirp, so that the received signals can be filtered to remove those from other systems 126, i.e., received signals not having the correct characteristic.

FIG. 3 depicts an example of how an acoustic signal is reflected from a smooth surface 302, in accordance with various aspects of the subject technology. The system 310 includes an emitter and a receiver and emits a first acoustic signal 312 approximately perpendicular to the surface 302. A second acoustic signal 320 is created by reflection of the acoustic signal 312 from the surface 302 and propagates back toward the system 310, where it is detected by the receiver of system 310. In the hypothetical case where surface 302 is perfectly and completely smooth, the second acoustic signal 320 will be very similar to the first acoustic signal 312 in form and strength.

In certain embodiments, the receiver provides a data signal that comprises a portion of the second acoustic signal. In certain embodiments, the receiver provides only a signal parameter, e.g., a maximum amplitude of the second acoustic signal.

FIG. 4 depicts another example of how an acoustic signal is reflected from a rough surface 304, in accordance with various aspects of the subject technology. The first acoustic signal 312 will be reflected from surface 304 in two ways-a coherent reflection signal 330 that is associated with a portion of the surface 304 that is smooth, and one or more incoherent reflection signals 332, 334 that that are associated with portions of the surface 304 that are locally rough. In certain embodiments, the rough portions comprise one or more of a scratch, a dent, an area of corrosion, an area of material erosion, or an area wherein a coating has been removed.

Reflection of the first acoustic signal 312 from a real surface 304, e.g., the surface has some amount of roughness however small, modifies one or more signal parameters of the first acoustic signal 312, e.g., a peak amplitude, a signal width, a center frequency, or a frequency bandwidth of the signal, such that the second acoustic signal 320 does not have the same form as the first acoustic signal 312. The changes are the result of dispersion of a portion of the incident acoustic signal 312 by non-smooth features on the surface 302 and the second acoustic signal 320 is not simply an attenuation of the first acoustic signal 312.

In certain embodiments, the volume of space between the system 310 and the surface 304 is filled with a generally uniform fluid (not visible in FIG. 4), including a first material mixed with a dispersed second material. In certain embodiments, the fluid is at an elevated temperature and/or an elevated pressure. In certain embodiments, the fluid is a gas, e.g., air or natural gas or any other substance that is in a gaseous form or a supercritical form at the pressure and temperature of the fluid, or a generally uniform mixture of multiple gases. In certain embodiments, the fluid is a liquid, e.g., water or an oil or any material that is liquid at the pressure and temperature of the fluid, or a generally uniform mixture of multiple liquids. In certain embodiments, the fluid is a heterogenous mixture of two or more gaseous, liquid, and solid components.

In certain embodiments, the volume of space between the system 310 and the surface 304 is filled with a first fluid and there is also a coating of a second fluid (not shown in FIG. 4) on the surface 304. For example, the volume of space is filled with air and there is a coating of oil on the surface 304. In certain embodiments, the coating of the second material degrades the quality of the reflected acoustic signal 330, 332, 334, e.g., a secondary reflection from the surface of the second material in addition to the reflection from the surface 304, attenuation of the signal by the second material, or increased dispersion of the acoustic signal by the second material. With reference to FIG. 1, the purpose of the surface preparation device 128 is to reduce the thickness of the coating of the second material to a thickness thereby reducing the effect of the coating on the reflected signal.

FIG. 5 depicts examples of how an acoustic signal is reflected at an angle from a smooth surface 302, in accordance with various aspects of the subject technology. In certain embodiments, an acoustic emitter 510 is provided separate from an acoustic receiver 512, although both emitter 510 and receiver 512 are coupled to a common structure, e.g., the body 122 of FIG. 1, in known positions relative to each other. The emitter 510 emits a first acoustic signal 312 along emission axis 212. A coherent second acoustic signal 320 is reflected from the smooth surface 302 along the reflective axis 214 and is received and detected by acoustic receiver 512.

In certain embodiments, an external device (not shown in FIG. 5) is emitting an acoustic wave that is functionally equivalent to the acoustic signal 312 and the emitter 510 is replaced by a second receiver 512 (not shown in FIG. 5) that is disposed so as to directly receive the acoustic signal emitted by the external device. This received emission signal is then used as the source signal for comparison to the received reflected signal 320.

FIG. 6 depicts another example of how an acoustic signal is reflected from a rough surface 304, in accordance with various aspects of the subject technology. Acoustic emitter 510 emits a first acoustic signal 312 along emission axis 212 and acoustic receiver 512 is positioned along the reflective axis 214 so as to receive and detect the coherent reflection signal 330. One or more secondary receivers 514 are positioned off-axis from the reflection axis 512 so as to receiver and detect incoherent reflected signals 332, 334.

In certain embodiments, the system and methods disclosed herein are implemented using an optical emitter and an optical receiver in place of the acoustic emitter 510 and acoustic receivers 512, 514. The first acoustic signal 312 is replaced by a beam of light, which has a frequency and an intensity, that is reflected by the surface 304. A portion of the incident beam of light is reflected in a specular manner to replace the coherent reflected acoustic signal 330. A portion of the incident beam of light is reflected in a diffuse manner to replace the incoherent reflected acoustic signals 332, 334. As used within this disclosure, the term "light" means electromagnetic radiation having a wavelength in the range of 100 nanometers to 1 millimeter. As used within this disclosure, the phrases "wave emitter" and "wave receiver" and "wave transceiver" and the like include devices that emit and/or receive one or more of acoustic signals, i.e., comprising sound, and optical signals, i.e., comprising light. As used within this disclosure, the phrase "wave signal" comprises one or more of an acoustic signal and an optical signal. In certain embodiments, a wave transceiver comprises one or more of a wave emitter and a wave transceiver.

Figures 7, 8, 9, 10, 11, 12:
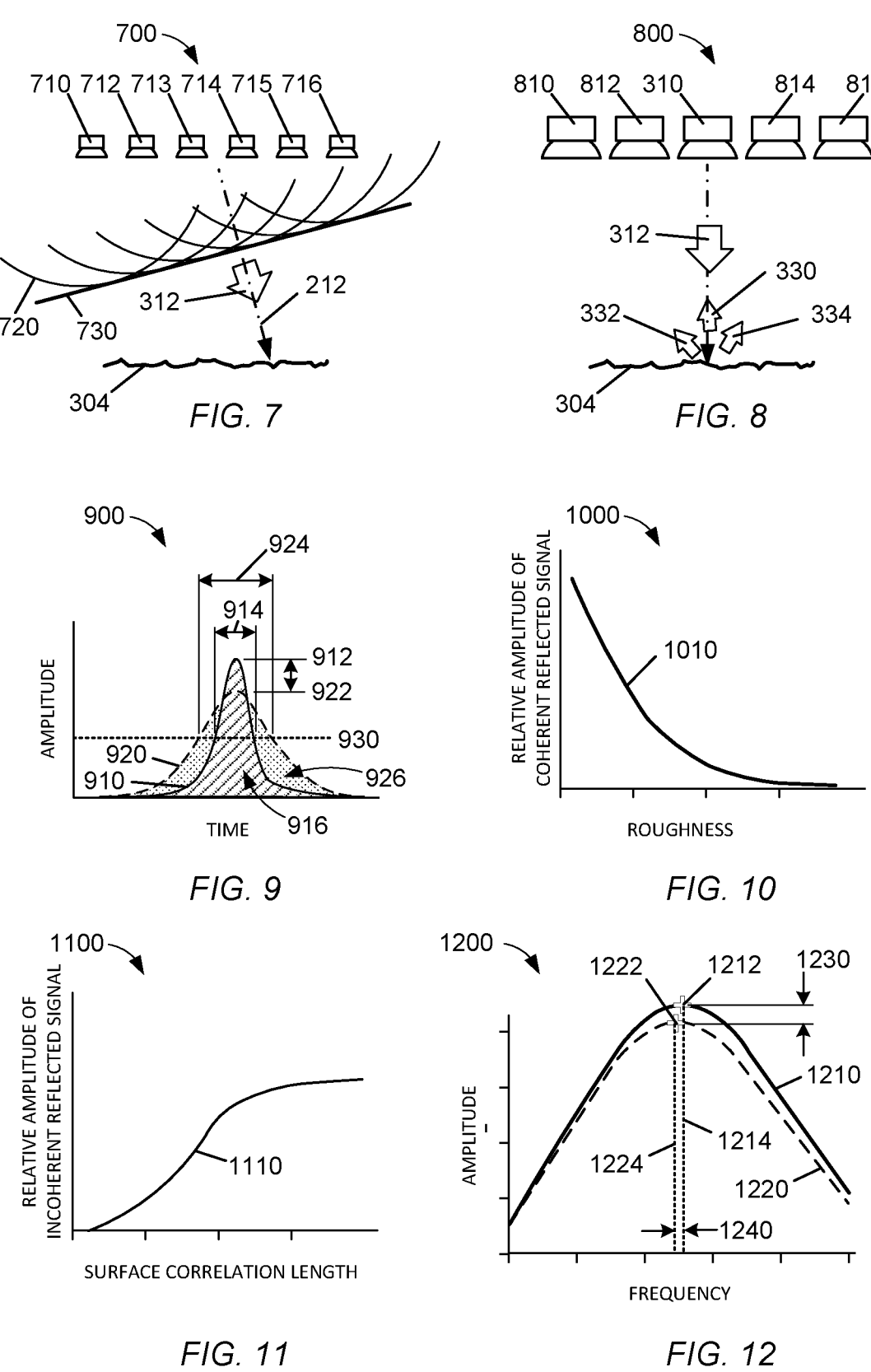
FIGS. 9-12 depict example characteristics of a returned acoustic signal, in accordance with various aspects of the subject technology.

FIG. 7 depicts another example of how an acoustic signal 312 is emitted along an emission axis 312, in accordance with various aspects of the subject technology. In this example, an array 700 of emitters 710-716 is arranged parallel to the surface 304 at known positions. Each emitter is triggered individually to emit an individual acoustic signal, e.g., emitter 710 emits acoustic signal having a wavefront 720. When the emitters 710-716 are triggered in sequence, the combined wavefronts form a composite planar wavefront 730 that emulates an acoustic signal 312 that propagates along emission axis 212 at an angle to the surface 304. This is sometimes referred to as a "phased array" and the emission axis 212 is steerable by adjustment of the timing, or "phasing," of the triggering of the array 700.

FIG. 8 depicts an example of detecting the coherent and incoherent reflections of an acoustic signal using a matrix 800 of receivers, in accordance with various aspects of the subject technology. In this example, an emitter/receiver 310 is position proximate to the surface 304 and receivers 810, 812, 814, 816 are positioned adjacent to the emitter/receiver 310. The emitter/receiver 310 emits an acoustic signal 312 that creates a coherent reflection signal 330 and incoherent reflection signals 332, 334. The emitter/receiver 3310 will receive and detect the coherent signal 330. The adjacent detectors 810-816 will receive and detect portions of the incoherent signals 332, 334. In certain embodiments (not shown in FIG. 8), the receivers 810-816 are arranged so that a total path length from the emitter/receiver 310 to the surface 304 and then to each of the individual receivers is the same as the total path length of the coherent signal, i.e., twice the distance from the emitter/receiver 310 to the surface 304, so as to align the phase of the received signals.

FIG. 9 depicts an amplitude-vs-time plot 900 of an emitted acoustic signal 910 and a reflected acoustic signal 920, in accordance with various aspects of the subject technology. In this example, the emitted acoustic signal 910 is a single pulse having one or more signal parameters, e.g., a peak amplitude 912 and a width 914 defined at a predetermined amplitude 930 and an area 916. Likewise, the reflected acoustic signal 920 has the signal parameters of a peak amplitude 922 and a width 924 at the predetermined amplitude 930 and an area 926. The signal parameters may be compared in known ways, e.g., the received parameter as a percentage of the emitted parameter, a difference between the two values of a parameter.

FIG. 10 depicts a plot 1000 of a correlation curve 1010 of the relative amplitude of a coherent reflected signal, compared to the corresponding amplitude of the associated emitted signal, to the roughness, e.g., expressed in micrometers or microns, of the surface that reflected the emitted acoustic signal, in accordance with various aspects of the subject technology. In certain embodiments, the amplitude is presented in terms of a percentage of the amplitude of the emission signal. In certain embodiments, the amplitude is presented in absolute numbers, e.g., a sound intensity expressed in watts per square meter. In certain embodiments, the amplitude is expressed in one of a sound pressure, a sound power, a sound energy, and a sound energy density. The curve 1010 enables the conversion of a measurement of a coherent reflected acoustic signal to be associated with a roughness. In certain embodiments, the roughness is presented in terms that are associated with a particular aspect of the pipeline condition, e.g., a degree of loss of a coating, a loss of pipe material, a degree of corrosion, or a degree of drag. In certain embodiments, the shape of curve 1010 is associated with the original finish on the surface, e.g., a surface that was originally highly polished will have a different curve 1010 than surface that was originally a matte finish.

FIG. 11 depicts a plot 1100 of a correlation curve 1110 of the amplitude of an incoherent reflected signal, compared to the corresponding amplitude of the associated emitted signal, to a surface correlation length, e.g., expressed in micrometers or microns, of the surface that reflected the emitted acoustic signal, in accordance with various aspects of the subject technology. The curve 1110 enables the conversion of a measurement of an incoherent reflected acoustic signal to be associated with a degree of roughness. In general, the larger the scale of the surface defect, the larger the amount of acoustic energy reflected in an incoherent manner. In certain embodiments, the shape of curve 1110 is associated with the type of roughness existing on the surface, e.g., a surface dominated by corrosion will have a different curve 1110 than a surface dominated by scratches and abrasive damage.

FIG. 12 depicts a frequency plot 1200 of an emitted acoustic signal 1210 and a reflected coherent acoustic signal 1220, in accordance with various aspects of the subject technology. In each case, the respective signal has been converted from the time domain to the frequency domain, e.g., by a fast Fourier transform (FFT). The curve 1210 has a peak value 1212 at a frequency 1214 and curve 1220 has a peak value 1222 at a frequency 1224.

There is an amplitude change 1230 between the peak values of curves 1210 and 1220 and a frequency shift 1240 between the peak frequencies of curves 1210, 1220. In certain embodiments, the amplitude change 1230 is associated with a roughness parameter of the interior of the surface that reflected the incident acoustic signal 1210 to create the reflected acoustic signal 1220. In certain embodiments, the frequency 1240 is associated with a relatively stronger scattering of the higher-frequency components of the incident acoustic signal 1210 on non-smooth features. The higher-frequency components in the coherent signal are reduced more by the scattering, thus biasing the frequency content of the reflected acoustic signal 1220 and shifting the peak frequency 1224 downward.

Figure 13:
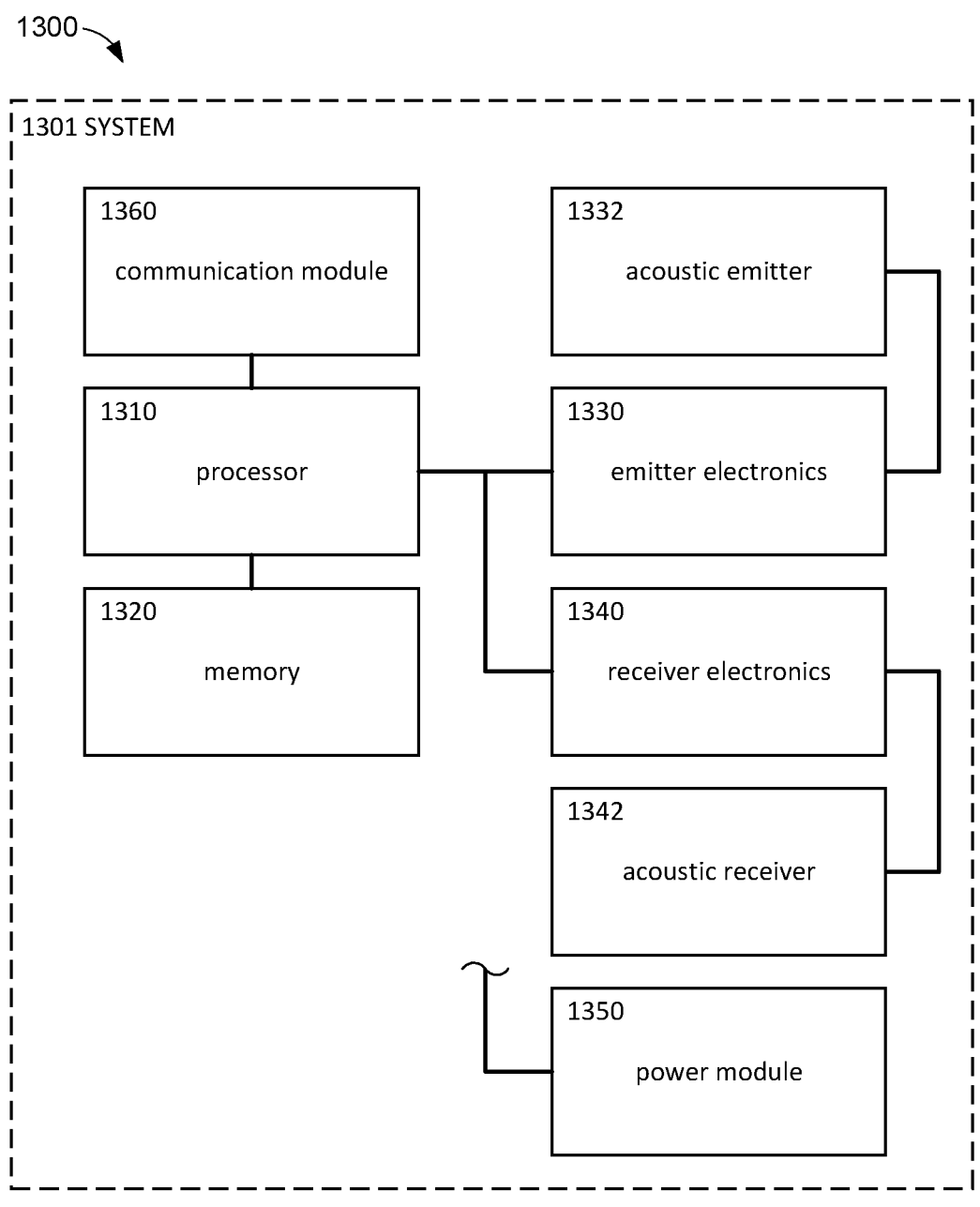
FIG. 13 is a block diagram of an example system for measuring a roughness of a surface, in accordance with various aspects of the subject technology.

FIG. 13 is a block diagram 1300 of an example system 1301 for measuring a roughness of a surface, in accordance with various aspects of the subject technology. The system has an acoustic emitter 1332, with associated emitter electronics 1330, and an acoustic receiver 1342, with associated receiver electronics 1340. The electronics 1330, 1340 are communicatively coupled to a processor 1310 that is further coupled to a memory 1320 and a communication module 1360. The system 1301 comprises a power module that provides power to each of the components, although the specific connections have been omitted for clarity. The physical structure of the system 1301, e.g., a body to which each of the components are physically coupled, is omitted for clarity.

The memory contains instructions that, when loaded into the processor 1310 and executed, cause the processor 1310 to perform certain actions, e.g., steps of a process. In certain embodiments, the instructions cause the processor 1310 to perform one or more of the following steps: comparing a first value of a signal parameter of the emitted acoustic signal to a second value of the same signal parameter of the reflected acoustic signal, wherein the reflected acoustic signal is one of a coherent reflected signal or an incoherent reflected signal, wherein the signal parameter is one of an amplitude; a width; a frequency; an area under an amplitude-vs-time plot of the respective acoustic signal within a predefined time window centered about an amplitude peak of the first acoustic signal; and an area under a frequency plot of the respective acoustic signal within a predefined frequency window centered about a frequency peak of the first acoustic signal; and determining a roughness parameter based in part on the comparison of the first and second values.

The communication module 1360 is configured to exchange information with a remote system, e.g., a server, a supervisory program, or a database. In certain embodiments, one or more of the processor 1310, the memory 1320, and the communication module 1360 are remote from the system 1301.

In summary, the disclosed system provides a means of acoustically inspecting an interior surface of a pipeline, although the disclosed systems and methods may be used to evaluate any surface. The system has an emitter that emits an acoustic signal, which has one or more signal parameters, that is reflected by the surface being inspected and the reflected signal is detected by a receiver of the system. The system may receive and detect both coherent and incoherent acoustic reflections of the emitted signal. The received signal is compared to the emitted signal and a roughness parameter is determined, based in part on the comparison of the two signals.

For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

In the above description, terms such as "upper," "upward," "lower," "downward," "above," "below," "longitudinal," "lateral," and the like, as used herein, are explanatory in relation to respective view of the item presented in the associated figure and are not limiting in the claimed use of the item. The term "outside" refers to a region that is beyond the outermost confines of a physical object. The term "inside" indicates that at least a portion of a region is partially contained within a boundary formed by the object.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language reciting "an item" or similar language indicates and includes one or more of the items. For example, claim language reciting "a part" means one part or multiple parts. Moreover, claim language reciting "at least one of" a set indicates that one member of the set or multiple members of the set satisfy the claim. For example, claim language reciting "at least one of A and B" means A, B, or A and B.

Statements of the disclosure include:

(A1) A system for evaluating a roughness of a surface, comprising: configured a wave emitter configured to emit a first wave signal; a wave receiver coupled to the wave emitter and configured to detect a second wave signal that comprises a reflection of the first wave signal from the surface and provide a data signal comprising a portion of the second wave signal; and a processor communicatively coupled to the emitter and to the receiver and configured to receive the data signal and determine the roughness based in part on a difference between the first wave signal and the second wave signal.

(A2) The system of A1, further comprising: a memory communicatively coupled to the processor, the memory comprising instructions that, when loaded into the processor and executed, cause the processor to perform steps: comparing a first value of a signal parameter of the first wave signal to a second value of the signal parameter of the second wave signal; and determining a roughness based in part on the comparison of the first and second values.

(A3) The system of A2, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a predefined frequency window centered about a frequency peak of the first wave signal, or a combination thereof.

(A4) The system of A3, wherein: the step of comparing comprises one of: calculating a difference between the first and second values; and calculating a ratio of the second value to the first value; the step of determining a roughness comprises using a predetermined curve to determine the roughness associated with one of the calculated difference and the calculated ratio.

(A5) The system of A4, wherein: the second wave signal comprises a coherent reflected signal and an incoherent reflected signal; and the step of comparing comprises a first comparison of the coherent reflected signal to the first wave signal and a second comparison of the incoherent reflected signal to the first wave signal; and the step of determining a roughness is based in part on the first comparison and based in part on the second comparison.

(A6) The apparatus of A1, wherein: the emitter is configured to emit the first wave signal along an emission axis; and at least one receiver is disposed on a reflection axis that is defined by a specular reflection of the emission axis from an ideally smooth form of the surface.

(A7) The apparatus of A1, wherein: the wave emitter is an acoustic emitter configured to emit a first acoustic signal; the wave receiver is an acoustic receiver configured to detect a second acoustic signal that comprises a reflection of the first acoustic signal from the surface; the data signal comprises a portion of the second acoustic signal; and the processor is configured to determine the roughness based in part on a difference between the first acoustic signal and the second acoustic signal.

(B8) A memory communicatively coupled to a processor, the memory comprising instructions that, when loaded into the processor and executed, cause the processor to perform steps of: causing an wave emitter that is disposed proximate to a surface to emit a first wave signal; receiving a data signal from an wave receiver that is disposed so as to detect a second wave signal that comprises a reflection of the first wave signal from the surface, the data signal comprising a portion of the second signal; comparing the first wave signal and the received portion of the second wave signal; and determining a roughness of the surface based in part on the comparison of the first and second wave signals.

(B9) The memory of B8, wherein: the step of comparing the first and second wave signals comprises comparing a first value of a signal parameter of the first wave signal to a second value of the signal parameter of the second wave signal; and the step of determining a roughness based in part on the comparison of the first and second values.

(B10) The memory of B9, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a predefined frequency window centered about a frequency peak of the first wave signal, or a combination thereof.

(B11) The memory of B10, wherein: the step of comparing comprises one of: calculating a difference between the first and second values; and calculating a ratio of the second value to the first value; the step of determining a roughness comprises using a predetermined curve to determine the roughness associated with one of the calculated difference and the calculated ratio.

(B12) The memory of B11, wherein: the second wave signal comprises a coherent reflected signal and an incoherent reflected signal; and the step of comparing comprises a first comparison of the coherent reflected signal to the first wave signal and a second comparison of the incoherent reflected signal to the first wave signal; and the step of determining a roughness is partially based on both of the first and second comparisons.

(B13) The memory of B8, wherein: the emitter is configured to emit the first wave signal along an emission axis; and at least one receiver is disposed on a reflection axis that is defined by a specular reflection of the emission axis from an ideally smooth form of the surface.

(B14) The memory of B8, wherein: the wave emitter is an acoustic emitter and the first wave signal is a first acoustic signal; the wave receiver is an acoustic receiver and the second wave signal is a second acoustic signal that comprises a reflection of the first acoustic signal from the surface; the data signal comprises a portion of the second acoustic signal; the step of comparing comprises comparing the first acoustic wave to the received portion of the second acoustic wave; and the step of determining a roughness is based in part on the comparison of the first and second acoustic signals.

(C15) A method of evaluating a roughness of a surface, comprising steps: causing a wave emitter that is disposed proximate to a surface to emit a first wave signal; receiving a data signal from a wave receiver that is disposed so as to detect a second wave signal that comprises a reflection of the first wave signal from the surface, the data signal comprising a portion of the second wave signal; comparing the first wave signal and the received portion of the second wave signal; and determining a roughness of the surface based in part on the comparison of the first and second acoustic wave signals.

(C16) The method of C15, wherein: the step of comparing the first and second wave signals comprises comparing a first value of a signal parameter of the first wave signal to a second value of the signal parameter of the second wave signal; and the step of determining a roughness based in part on the comparison of the first and second values.

(C17) The method of C16, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a pre-defined frequency window centered about a frequency peak of the first wave signal, or a combination thereof.

(C18) The method of C17, wherein: the step of comparing comprises one of: calculating a difference between the first and second values; and calculating a ratio of the second value to the first value; the step of determining a roughness comprises using a predetermined curve to determine the roughness associated with one of the calculated difference and the calculated ratio.

(C19) The method of C18, wherein: the second wave signal comprises a coherent reflected signal and an incoherent reflected signal; and the step of comparing comprises a first comparison of the coherent reflected signal to the first wave signal and a second comparison of the incoherent reflected signal to the first wave signal; and the step of determining a roughness is partially based on both of the first and second comparisons.

(C20) The method of C15, wherein: the wave emitter is an acoustic emitter and the first wave signal is a first acoustic signal; the wave receiver is an acoustic receiver and the second wave signal is a second acoustic signal that comprises a reflection of the first acoustic signal from the surface; the data signal comprises a portion of the second acoustic signal; the step of comparing comprises comparing the first acoustic wave to the received portion of the second acoustic wave; and the step of determining a roughness is based in part on the comparison of the first and second acoustic signals.

What is claimed is:

1. A system for evaluating a roughness of a nonplanar surface of an interior of a pipeline used to transport a fluid, comprising:
    a wave emitter configured to emit a first wave signal toward the interior of the pipeline;
    a wave receiver coupled to the wave emitter and config-ured to detect a second wave signal that comprises a reflection of the first wave signal from the nonplanar surface and provide a data signal comprising a portion of the second wave signal,
wherein the second wave signal comprises a coherent reflected signal and a plurality of incoherent reflected signals; and
a processor communicatively coupled to the emitter and to the receiver and configured to receive the data signal and determine the roughness based in part on a com-parison of the plurality of incoherent reflected signals to the first wave signal.

2. The system of claim 1, further comprising:
a non-transitory computer-readable storage memory com-municatively coupled to the processor, the memory comprising instructions that, when loaded into the processor and executed, cause the processor to perform steps:
    comparing a first value of a signal parameter of the first wave signal to a second value of the signal parameter of the second wave signal; and
    determining a roughness based in part on the compari-son of the first and second values.

3. The system of claim 2, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a pre-defined frequency window centered about a frequency peak of the first wave signal, or a combination thereof.

4. The system of claim 3, wherein:
the step of comparing comprises one of:
    calculating a difference between the first and second values; and
    calculating a ratio of the second value to the first value;
the step of determining a roughness comprises using a predetermined curve to determine the roughness asso-ciated with one of the calculated difference and the calculated ratio.

5. The system of claim 4, wherein:
the step of comparing comprises at least one of a first comparison of the coherent reflected signal to the first wave signal and a second comparison of the incoherent reflected signal to the first wave signal; and
the step of determining a roughness is based in part on at least one of the first comparison and the second com-parison.

6. The system of claim 1, wherein:
the emitter is configured to emit the first wave signal along an emission axis; and
at least one receiver is disposed on a reflection axis that is defined by a specular reflection of the emission axis from an ideally smooth form of the surface.

7. The system of claim 1, wherein:
the wave emitter is an acoustic emitter configured to emit a first acoustic signal;
the wave receiver is an acoustic receiver configured to detect a second acoustic signal that comprises a reflec-tion of the first acoustic signal from the surface;
the data signal comprises a portion of the second acoustic signal; and
the processor is configured to determine the roughness based in part on a difference between the first acoustic signal and the second acoustic signal.

8. A non-transitory computer-readable storage memory communicatively coupled to a processor, the non-transitory computer-readable storage memory comprising instructions that, when loaded into the processor and executed, cause the processor to perform steps of:

causing a wave emitter that is disposed proximate to a nonplanar surface of an interior of a pipeline used to transport a fluid to emit a first wave signal;

receiving a data signal from a wave receiver that is disposed so as to detect a second wave signal that comprises a reflection of the first wave signal from the nonplanar surface, the data signal comprising a portion of the second wave signal, wherein the second wave signal comprises a coherent reflected signal and a plurality of incoherent reflected signals;

comparing the first wave signal and the received portion of the second wave signal; and determining a roughness of the surface based in part on a comparison of the plurality of incoherent reflected signals to the first wave signal.

9. The non-transitory computer-readable storage memory of claim 8, wherein:

the step of comparing the first and second wave signals comprises comparing a first value of a signal parameter of the first wave signal to a second value of the signal parameter of the second wave signal; and the step of determining a roughness based in part on the comparison of the first and second values.

10. The non-transitory computer-readable storage memory of claim 9, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a predefined frequency window centered about a frequency peak of the first wave signal, or a combination thereof.

11. The non-transitory computer-readable storage memory of claim 10, wherein:

the step of comparing comprises one of:

calculating a difference between the first and second values; and calculating a ratio of the second value to the first value;

the step of determining a roughness comprises using a predetermined curve to determine the roughness associated with one of the calculated difference and the calculated ratio.

12. The non-transitory computer-readable storage memory of claim 11, wherein:

the step of comparing comprises at least one of a first comparison of the coherent reflected signal to the first wave signal and a second comparison of the incoherent reflected signal to the first wave signal; and the step of determining a roughness is based in part on at least one of the first comparison and the second comparison.

13. The non-transitory computer-readable storage memory of claim 8, wherein:

the emitter is configured to emit the first wave signal along an emission axis; and at least one receiver is disposed on a reflection axis that is defined by a specular reflection of the emission axis from an ideally smooth form of the surface.

14. The non-transitory computer-readable storage memory of claim 8, wherein:

the wave emitter is an acoustic emitter and the first wave signal is a first acoustic signal;

the wave receiver is an acoustic receiver and the second wave signal is a second acoustic signal that comprises a reflection of the first acoustic signal from the surface;

the data signal comprises a portion of the second acoustic signal;

the step of comparing comprises comparing the first acoustic wave to the received portion of the second acoustic wave; and the step of determining a roughness is based in part on the comparison of the first and second acoustic signals.

15. A method of evaluating a roughness of a surface, comprising steps:

causing a wave emitter that is disposed proximate to a nonplanar surface of an interior of a pipeline used to transport a fluid to emit a first wave signal;

receiving a data signal from a wave receiver that is disposed so as to detect a second wave signal that comprises a reflection of the first wave signal from the nonplanar surface, the data signal comprising a portion of the second wave signal, wherein the second wave signal comprises a coherent reflected signal and a plurality of incoherent reflected signals;

comparing the first wave signal and the received portion of the second wave signal; and determining the roughness of the surface based in part on a comparison of the plurality of incoherent reflected signals to the first wave signal.

16. The method of claim 15, wherein:

the step of comparing the first and second wave signals comprises comparing a first value of a signal parameter of the first wave signal to a second value of the signal parameter of the second wave signal; and the step of determining a roughness based in part on the comparison of the first and second values.

17. The method of claim 16, wherein the signal parameter comprises a width, a frequency, a frequency shift, an area under an amplitude-vs-time plot of the respective wave signal within a predefined time window centered about an amplitude peak of the first wave signal, an area under a frequency plot of the respective wave signal within a predefined frequency window centered about a frequency peak of the first wave signal, or a combination thereof.

18. The method of claim 17, wherein:

the step of comparing comprises one of:

calculating a difference between the first and second values; and calculating a ratio of the second value to the first value;

the step of determining a roughness comprises using a predetermined curve to determine the roughness associated with one of the calculated difference and the calculated ratio.

19. The method of claim 18, wherein:

the step of comparing comprises at least one of a first comparison of the coherent reflected signal to the first wave signal and a second comparison of the incoherent reflected signal to the first wave signal; and the step of determining a roughness is based in part on at least one of the first comparison and the second comparison.

20. The method of claim 15, wherein:

the wave emitter is an acoustic emitter and the first wave signal is a first acoustic signal;

the wave receiver is an acoustic receiver and the second wave signal is a second acoustic signal that comprises a reflection of the first acoustic signal from the surface;

the data signal comprises a portion of the second acoustic signal;

the step of comparing comprises comparing the first acoustic wave to the received portion of the second acoustic wave; and the step of determining a roughness is based in part on the comparison of the first and second acoustic signals.

\* \* \* \* \*